Patented Apr. 17, 1951

2,549,470

UNITED STATES PATENT OFFICE 2,549,470

SYNTHESIS OF ALCOHOLS

Benjamin W. Howk, Wilmington, and Glenn F. Hager, New Castle, Del., assignors to E. I. du Pont de Nemours & Company, Wilmington, Del., a corporation of Delaware No Drawing. Application April 12, 1949, Serial No. 87,114

10 Claims. (Cl. 260—449)

This invention relates to a catalytic process for preparing alcohols. In particular embodiments, it relates to a process for synthesizing alcohols from carbon monoxide and hydrogen.

It is known that, in the presence of specific catalysts and under certain conditions of temperature and pressure, carbon monoxide and hydrogen react to give methanol and higher alcohols. It is also known that under other conditions, involving the use of ruthenium catalysts, the reaction leads to paraffin waxes. Under the procedural conditions heretofore known, straight chain alcohols higher than methanol have been obtained in the catalytic reaction of carbon monoxide with hydrogen, but it has not been possible by these previously known processes to obtain such higher straight chain alcohols as virtually the only products, i. e. to the virtual exclusion of hydrocarbons, carboxylic acids, etc.

An object of this invention is to prepare straight chain primary alcohols efficiently by reaction between carbon monoxide and hydrogen. Another object is to prepare primary alcohols in which a long polymethylene chain is attached to a hydroxyl group. Other objects of the invention appear hereinafter.

This invention provides a process for preparing alcohols, and more particularly straight chain primary hydroxyalkanes having from 3 to 50 or more carbon atoms in the molecule, by introducing hydrogen, carbon monoxide and a hydroxylated solvent into a reaction vessel, and heating the mixture in the presence of a catalyst of the class consisting of ruthenium metal, ruthenium oxide, and ruthenium carbonyl, at a pressure within the range of 200 to 1000 atmospheres and at a temperature within the range of 100 to 250° C. The liquid hydroxyl-containing reaction medium may be water or an alcohol, preferably a primary hydroxyalkane having from 1 to 10 carbon atoms per molecule.

The products obtained by the process of this invention are, in general, mixtures containing, as virtually the only products, straight-chain primary alcohols ranging from methanol to long chain alcohols having, in particular embodiments, 50 or more carbon atoms per molecule. A substantial proportion of the reaction products usually consists of alcohols containing more than six carbon atoms per molecule. The reaction products usually contain virtually no hydrocarbons, acids, esters or branched-chain alcohols. These results were entirely unexpected, in view of the existing knowledge of the catalytic reaction between carbon monoxide and hydrogen in the presence of alcohols and group VIII metal catalysts.

The mechanism of the catalysis occurring in the practice of this invention is not definitely known. The active agent may be ruthenium metal itself, or a ruthenium carbonyl formed transitorily. Be that as it may, ruthenium, and compounds thereof herein disclosed, are specific conversion agents for the formation of straight-chain primary alcohols. It has been found that other metals such as cobalt, nickel, copper, manganese, their oxides and salts or the metal chromites do not lead selectively to straight-chain primary alcohols under the conditions herein disclosed.

Ruthenium is most conveniently used in the form of its dioxide, which is believed to be reduced in situ. Commercial ruthenium dioxide is quite satisfactory but, if desired, an efficient catalyst (or catalyst generator) may be prepared as follows:

To 80 parts of potassium hydroxide fused in a silver crucible is added 8 parts of powdered ruthenium metal. In the course of 2 hours, 8 parts of potassium nitrate is added to the melt in small portions, and after an additional hour the melt is cooled to room temperature, dissolved in 800 parts of hot distilled water and filtered through asbestos on a fritted disc funnel. The filtered potassium ruthenate solution is made up to 1000 parts by volume by rinsing the filter with hot distilled water. The solution is then heated to boiling and reduced by treatment with 16 parts by volume of methanol. The ruthenium dioxide which precipitates is filtered and washed successively with 1500 parts of distilled water, 2000 parts of 1% nitric acid and 4000 parts of distilled water. After drying in a vacuum oven at 100° C. for 16 hours, the catalyst is ready for use. If desired, a very active supported catalyst may be prepared by adding 10 parts of purified charcoal to the filtered potassium ruthenate solution (prepared as described above) prior to reduction by methanol. After washing and drying as above, the catalyst (18.9 parts) is ready for use.

The catalysts which may be employed in the practice of the invention include not only ruthenium metal, ruthenium oxides (e. g., dioxide, sesquioxide or tetraoxide), and ruthenium carbonyls (e. g., diruthenium nonacarbonyl, ruthenium carbonyl hydride), but also ruthenium-containing compounds, such as ruthenium salts of organic carboxylic acids, which give rise to the formation of a ruthenium carbonyl under the reaction conditions. The ruthenium catalysts may be used as such or on a support such as charcoal, alumina, silica gel, etc. The quantity of catalyst which is employed is not highly critical but it is desirable to use a sufficient amount to effect a reasonably rapid reaction, e. g., about 0.001% to about 20% by weight of ruthenium dioxide, or an equivalent weight of ruthenium in any other form, based on the total quantity of reaction mixture.

The mole ratio of the gaseous reactants must be carefully controlled in order to achieve good results, and it has been found that a large excess of carbon monoxide relative to hydrogen leads to decreased yields of straight-chain alcohols higher than methanol. It is desirable to use hydrogen and carbon monoxide in the molar ratio of at least 1.5:1. A lower ratio of hydrogen to carbon monoxide is detrimental, particularly in continuous flow systems employing ruthenium metal or oxide, for it leads to gradual loss of the catalyst. An excess of hydrogen does not appear to be detrimental, and the mole ratio $H_2:CO$ may be as high as 10:1 or higher if desired. The best results are obtained when this ratio is between 2:1 and 3:1. The formation of an alcohol from carbon monoxide and hydrogen may be represented, at least in part, by the equation:

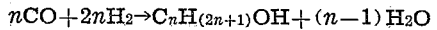

$$nCO + 2nH_2 \rightarrow C_nH_{(2n+1)}OH + (n-1)H_2O$$

It is preferable to mix the synthesis gas prior to the reaction, for example, by pressuring the reactants in a vessel fitted with a free rolling brass ball to aid in mixing, although the gases may be introduced in the reaction apparatus separately and simultaneously, through baffles or similar devices. If necessary, the gases may be previously deoxygenated, for example, by means of a scrubbing solution prepared from equal volumes of 20% aqueous sodium hydroxide and saturated aqueous hydroquinone solution. The gases may also be desulfurized by passing through a tower containing absorbent charcoal, or by conventional chemical desulfurization processes.

The reaction proceeds best within the relatively narrow temperature range of 100° to 250° C. Below 100° C. the reaction is unpractically slow. Above about 250° C., the proportion of esters and free acids in the reaction product begins to increase rapidly at the expense of the alcohols. The preferred temperature range is between 175° and 225° C.

The pressure has a considerable influence on the course of the reaction. It has been found that at pressures up to about 150 atmospheres, the reaction product contains only carbon and hydrogen and consists of hydrocarbon oils and waxes. It is highly surprising that a relatively small increase in pressure would radically change the nature of the reaction product, but this has been found to be the fact. At pressures exceeding 200 atmospheres the reaction product consists of primary alcohols with no detectable amount of hydrocarbons. The preferred pressure range for this desired reaction is between 200 and 1000 atmospheres, the best range being 300 to 1000 atmospheres.

It is essential that the reaction take place in the liquid phase. As the liquid reaction medium there may be used any neutral hydroxylated solvent, including water and any aliphatic alcohol such as methanol, ethanol, propanol, butanol, hexanol, octanol, decanol, dodecanol, octadecanol, ethylene glycol, hexamethylene glycol, glycerol, etc. For reasons of economy and good results, it is preferred to use either water or a primary monohydroxyalkane having from 1 to 10 carbons and preferably 2 to 6 carbons per molecule. If it is desired to obtain in the reaction product a high proportion of the long chain ($C_{10}$ to $C_{20}$ or higher) alcohols, the best reaction media appear to be the primary aliphatic alcohols of from 3 to 6 carbons, and especially n-propanol. The experimental evidence indicates that the reaction medium participates in the reaction. This is shown by the fact that, when an alcohol is used, some of it at least disappears and is not recovered in the reaction product. Mixtures of various alcohols, or of alcohols and water, may be used. For example, the mixed lower ($C_1$ to $C_4$) alcohols obtained in one run may be used as the reaction medium for subsequent runs.

It should be emphasized here that, under the conditions of temperature, pressure and gas ratios just described, no reaction takes place between carbon monoxide and hydrogen in a liquid medium (water or alcohol) if one of the common group VIII metal, such as cobalt or nickel, is used as the catalyst. This is evidenced by the fact that, using, for example, a cobalt catalyst, no significant drop in pressure is observed when carbon monoxide and hydrogen are contacted under the conditions recited. Ruthenium is thus unexpectedly different from these related metals.

It is often desirable to use in the reaction mixture a dispersing agent to facilitate the intimate mixing of all components, including the water which is always formed in the reaction, although this practice is by no means essential. Any commercial dispersing agent that has no poisoning effect on the catalyst can be used for this purpose. For the same reason, agitation of the reaction mixture is desirable, although not essential.

Frequently, the reaction fails to start upon heating the reaction mixture within the lower range of the specified temperatures, e. g., between 100 and 200° C. The cause for this failure is probably a temporary inactivation of the catalyst. When this happens, it has been found that it is only necessary to raise the temperature to about 230° C., or in the more obdurate cases to 250° C., to induce the reaction to start, as shown by the pressure drop. The source of heat is then cut off until the temperature is within the desired range which, as already said, should not exceed 250° C. and preferably 225° C. This heat activation of the catalyst is recommended as a general procedure.

The process of the invention may be carried out batchwise in a suitable pressure vessel. The progress of the reaction may be followed by the drop in pressure, in batchwise operation, the reaction being continued by further additions of carbon monoxide and hydrogen until an optimum amount of reaction product relative to the size of the vessel has been formed. The process may also be carried out continuously, for example, by pumping the gas mixture and the liquid reaction medium at the required pressure over a fixed catalyst bed in a heated zone at a predetermined rate. In continuous operation, there is preferably used a supported catalyst such as ruthenium on charcoal, which may be prepared as described above. The liquid space velocity may be about one volume per volume of catalyst per hour and the gas space velocity may be about 400 to 600 volumes (at standard temperature and pressure) per volume of catalyst per hour.

The invention is illustrated in greater detail by the following examples, in which parts are by weight unless otherwise specified.

*Example 1.*—A silver-lined pressure vessel of 400 parts by volume was flushed with nitrogen, charged with 3 parts of ruthenium dioxide, 2 parts of sodium lauryl sulfate as the dispersing agent and 80 parts of n-propyl alcohol, again flushed with nitrogen, evacuated and cold-pressured to 500 atmospheres with a mixture of hydrogen and carbon monoxide in the molar ratio of 2:1. The vessel was maintained at 200° C. for 18 hours, during which time the pressure was maintained at 700 to 1000 atmospheres by re-pressuring periodically with the same gas mixture. At the completion of the run, the vessel was cooled, vented and its contents were discharged.

The combined product from five such runs was filtered to remove the catalyst and the waxy material which was present. The mixture of catalyst and wax was rinsed with about 600 parts of n-pentane and the filtrate was separated into an organic layer and an aqueous layer. The aqueous layer was extracted with n-pentane until it remained at constant volume (437 parts by volume). The organic layer and pentane extracts were combined, dried over anhydrous potassium carbonate and fractionally distilled. After removal of the pentane, the following fractions were obtained:

| | Parts |
|---|---|
| Methanol and ethanol | 30.4 |
| n-Propanol | 207.8 |
| n-Butanol | 17.5 |
| n-Pentanol | 22.75 |
| n-Hexanol | 16.0 |
| n-Heptanol | 11.5 |
| n-Octanol | 12.0 |
| n-Nonanol | 4.0 |
| n-Decanol | 3.75 |
| n-Undecanol | 3.75 |
| n-Dodecanol through n-hexadecanol | 20.0 |

The alcohols from $C_4$ to $C_{11}$ were identified by their boiling points and by conversion to the corresponding phenylurethanes.

The wax originally separated by filtration (about 6 to 7 parts) comprised a mixture of higher primary alcohols having upwards of 40 carbon atoms, as indicated by carbon, hydrogen and hydroxyl number determination.

*Example 2.*—When the experiment of Example 1 was carried out at 255° C. but otherwise under similar conditions, the following distribution was obtained by distillation analysis of the product from two runs.

| | Parts |
|---|---|
| Methanol and ethanol | 11.42 |
| n-Propanol | 108.38 |
| $C_4$–$C_{10}$ primary aliphatic alcohols | 37.58 |
| Above $C_{10}$ primary aliphatic alcohols | 24.16 |
| Pentane-insoluble higher alcohols | 8.50 |

*Example 3.*—An experiment was carried out as described in Example 1 except that the n-propanol was replaced by 100 parts of distilled water and the temperature of the experiment was 250° C. The following product distribution was obtained by distillation analysis of the combined product from four runs:

| | Parts |
|---|---|
| $C_1$–$C_3$ primary aliphatic alcohols | 13.41 |
| $C_4$–$C_{11}$ primary aliphatic alcohols | 43.09 |
| $C_{12}$–$C_{15}$ primary aliphatic alcohols | 7.56 |
| Pentane-insoluble higher alcohols | 34.0 |

When this same experiment was repeated at 275° C., the reaction between carbon monoxide and hydrogen proceeded well but the reaction product contained chiefly esters and free acids, as judged from an oxygen content of 3.9% but a hydroxyl number of only 7.5. The hydroxyl number, which is the number of milligrams of potassium hydroxide equivalent to the hydroxyl content of 1 gram of sample, may be determined, for example, as described by Roberts and Schuette in Ind. Eng. Chem., Anal. Ed., 4, 257, (1932).

*Example 4.*—Reaction mixtures comprising 3 parts of ruthenium dioxide, 2 parts of sodium lauryl sulfate, 110 parts of ethylene glycol and a gas mixture of 2 moles of hydrogen per mole of carbon monoxide were heated at 200° C. and 200 to 1000 atmospheres pressure for 18 hours. From two such runs combined and worked up as in Example 1 there was obtained:

| | Parts |
|---|---|
| $C_1$–$C_3$ primary aliphatic alcohols | 6.67 |
| $C_4$–$C_{10}$ primary aliphatic alcohols | 26.24 |
| $C_{10}$–$C_{16}$ primary aliphatic alcohols | 20.0 |
| Pentane-insoluble higher alcohols | 24.0 |
| Ethylene glycol | 175.0 |

*Example 5.*—The hydrogenation of carbon monoxide in the mole ratio $2H_2:CO$ in a reaction mixture consisting of 3 parts of ruthenium dioxide, 2 parts of sodium lauryl sulfate, 50 parts of water and 50 parts of hexamethylene glycol at 225° to 240° C. and 700 to 1000 atmospheres for 15 hours gave the following products from 5 combined runs:

| | Parts |
|---|---|
| Hexamethylene glycol | 113.5 |
| $C_1$–$C_4$ primary aliphatic alcohols | 24.96 |
| $C_5$–$C_7$ primary aliphatic alcohols | 41.00 |
| $C_8$–$C_{10}$ primary aliphatic alcohols | 26.56 |
| $C_{11}$–$C_{27}$ primary aliphatic alcohols | 29.11 |
| Pentane-insoluble higher alcohols | 39.0 |

*Example 6.*—Hydrogen and carbon monoxide in 2:1 molar ratio were reacted at 200° C. and 200 to 300 atmospheres pressure over 3 parts of ruthenium dioxide in 100 parts of distilled water for 15 hours. Under these conditions no alcohol below n-butanol was obtained. The reaction product consisted of 11.58 parts of primary aliphatic alcohols boiling at 74 to 157° C. at 110 mm. pressure, 2.83 parts of primary aliphatic alcohols boiling at 133° to 154.5° C. at 33 mm. pressure, and 26.0 parts of pentane-insoluble higher alcohols.

*Example 7.*—Hydrogen and carbon monoxide in 2:1 molar ratio were reacted over a mixture of 3 parts ruthenium dioxide, 2 parts sodium lauryl sulfate and 82 parts n-hexanol at 225° C. at 300 to 1000 atmospheres pressure for 14 to 15 hours. Fractionation of the reaction product from five combined runs gave:

| | Parts |
|---|---|
| n-Hexanol | 226.5 |
| $C_1$–$C_3$ primary aliphatic alcohols | 30.0 |
| $C_4$–$C_5$ primary aliphatic alcohols | 74.7 |
| $C_7$–$C_9$ primary aliphatic alcohols | 25.3 |
| $C_{10}$–$C_{18}$ primary aliphatic alcohols | 61.6 |
| Pentane-insoluble higher alcohols | 52.2 |

When the reaction medium is a carboxylic acid or anhydride, rather than a neutral hydroxylated solvent, the reaction takes a different course leading chiefly to esters of primary alkanols. For example, a mixture of 3 parts of ruthenium dioxide in 100 parts of acetic anhydride was reacted with hydrogen and carbon monoxide in 2:1 molar ratio at 200° C. for 18 hours, the pressure being maintained in the range of 300 to 950 atmospheres by repressuring periodically with synthesis gas. The total pressure drop corresponded to 5280 atmospheres. Filtration of the reaction product gave a large quantity of wax together with a liquid (182 ml.). The wax was steam distilled and the two-phase distillate was extracted with n-pentane. The pentane extract was added to the original liquid product and the oil layer was separated. The remaining aqueous layer was in turn extracted with n-pentane until it reached constant volume. The combined pentane solution was dried over anhydrous calcium sulfate and fractionally distilled. A range of esters totaling 40.55 parts was obtained, boiling from 59° C. at atmospheric pressure to 150° C. at 116 mm. pressure. Analytical data (carbon, hydrogen and saponification number) indicated that the product was chiefly a mixture of alkyl acetates. However, hydroxyl number determinations indicated that some free alcohols were present. The wax obtained from the steam distillation residue amounted to 37.06 parts.

As can be seen by the foregoing description, this invention makes it possible to synthesize from carbon monoxide and hydrogen a series of primary, straight chain alkanols which are obtained substantially free from by-products and which are thus easily separable into individual components, or into cuts of selected boiling ranges. The process is particularly advantageous for the preparation of straight chain primary alkanols having three and more carbon atoms, i. e., the series of primary alkanols from n-propanol upwards, since these alcohols form the large bulk of the reaction product and have not heretofore been readily obtainable by hydrogenation of carbon monoxide. The reaction products contain substantial amounts of long chain alcohols, i. e., alcohols of 10 or more carbon atoms, which are particularly valuable as ingredients for wetting and dispersing agents. The solid portion of the reaction product comprises primary alkanols with chain lengths ranging up to 50 carbons. A large part of the reaction product consists of the straight chain primary alkanols having between 3 and 30 carbon atoms. It had not heretofore been possible to obtain these alcohols as major products by the catalytic combination of carbon monoxide with hydrogen. These and the other alcohols provided by this process may be used in any of the numerous applications described in the technical literature for straight chain, primary aliphatic alcohols.

We claim:

1. A process for preparing alcohols which comprises introducing into a reaction vessel a mixture of carbon monoxide, hydrogen, and a hydroxylated solvent of the class consisting of water and primary hydroxyalkanes, heating the said mixture in the presence of a ruthenium-containing catalyst of the class consisting of ruthenium metal, ruthenium oxides and ruthenium carbonyls, at a temperature within the range of 100° to 250° C. under a pressure within the range of 200 to 1000 atmospheres, the mol ratio of hydrogen to carbon monoxide being initially from 1.5:1 to 10:1, whereby a reaction occurs resulting in the formation from the said mixture of carbon monoxide, hydrogen and hydroxylated solvent of a mixture of straight chain primary hydroxyalkanes in which the number of carbon atoms per molecule is within the range of from 3 to 50 as substantially the only reaction products, and thereafter separating from the resulting mixture, hydroxyalkanes in which the number of carbon atoms per molecule is within the range of from 3 to 50.

2. A process for preparing alcohols which comprises introducing into a reaction vessel a mixture of carbon monoxide, hydrogen and water, heating the said mixture in the presence of a ruthenium-containing catalyst of the class consisting of ruthenium metal, ruthenium oxides and ruthenium carbonyls, at a temperature within the range of 100° to 250° C. under a pressure within the range of 200 to 1000 atmospheres, the mol ratio of hydrogen to carbon monoxide being initially from 1.5:1 to 10:1, whereby a reaction occurs resulting in the formation of a mixture of straight chain primary hydroxyalkanes in which the number of carbon atoms per molecule is within the range of from 3 to 50, said hydroxyalkanes being formed from the said mixture of carbon monoxide, hydrogen and hydroxylated solvent without any substantial quantity of hydrocarbon being formed, and thereafter separating from the resulting mixture hydroxyalkanes in which the number of carbon atoms per molecule is within the range of from 3 to 50.

3. A process for preparing alcohols which comprises introducing into a reaction vessel a mixture of carbon monoxide, hydrogen, and a primary monohydric alkanol having from 3 to 6 carbon atoms per molecule, heating the said mixture in the presence of a ruthenium-containing catalyst of the class consisting of ruthenium metal, ruthenium oxides and ruthenium carbonyls, at a temperature within the range of 100° to 250° C. under a pressure within the range of 200 to 1000 atmospheres, the mol ratio of hydrogen to carbon monoxide being initially from 1.5:1 to 10:1, whereby a reaction occurs resulting in the formation of a mixture of straight chain primary hydroxyalkanes in which the number of carbon atoms per molecule is within the range of from 3 to 50, said hydroxyalkanes being formed from the said mixture of carbon monoxide, hydrogen and hydroxylated solvent without any substantial quantity of hydrocarbon being formed, and thereafter separating from the resulting mixture hydroxyalkanes in which the number of carbon atoms per molecule is within the range of from 3 to 50.

4. The process of claim 3 in which the said primary monohydric alkanol is propanol.

5. The process of claim 3 in which the said primary monohydric alkanol is n-hexanol.

6. A process for preparing alcohols which comprises introducing into a reaction vessel a mixture of carbon monoxide, hydrogen, a hydroxylated solvent of the class consisting of water and primary hydroxyalkanes having from one to ten carbon atoms per molecule, heating the said mixture in the presence of a ruthenium-containing catalyst of the class consisting of ruthenium metal, ruthenium oxides and ruthenium carbonyls, at a temperature within the range of 100° to 250° C. under a pressure within the range of 700 to 1000 atmospheres, the mol ratio of hydrogen to carbon monoxide being initially from 1.5:1 to 10:1, whereby a reaction occurs resulting in the formation of a mixture of straight chain primary hydroxyalkanes in which the number of carbon atoms per molecule is within the range of from 3 to 50, said hydroxyalkanes being formed from the said mixture of carbon monoxide, hydrogen and hydroxylated solvent without any substantial quantity of hydrocarbon being formed, and thereafter separating from the resulting mixture hydroxyalkanes in which the number of carbon atoms per molecule is within the range of from 3 to 50.

7. A process for preparing alcohols which comprises introducing into a reaction vessel a mixture of carbon monoxide, hydrogen, a primary monohydric alkanol having from 3 to 6 carbon atoms per molecule, the mol ratio of hydrogen to carbon monoxide being initially from 1.5:1 to 10:1, heating the said mixture in the presence of a ruthenium-containing catalyst of the class consisting of ruthenium metal, ruthenium oxides and ruthenium carbonyls, at a temperature within the range of 100° to 250° C. under a pressure within the range of 700 to 1000 atmospheres, whereby a reaction occurs resulting in the formation of a mixture of straight chain primary hydroxyalkanes in which the number of carbon atoms per molecule is within the range of from 3 to 50, said hydroxyalkanes being formed from the said mixture of carbon monoxide, hydrogen and hydroxylated solvent, without any substantial quantity of hydrocarbon being formed, and thereafter separating from the resulting mixture hydroxyalkanes in which the number of carbon atoms per molecule is within the range of from 3 to 50.

8. A process for preparing alcohols which comprises introducing into a reaction vessel a mixture of carbon monoxide, hydrogen, a primary monohydric alkanol having from 3 to 6 carbon atoms per molecule, the mol ratio of hydrogen to carbon monoxide being initially from 2:1 to 5:1, heating the said mixture in the presence of a ruthenium-containing catalyst of the class consisting of ruthenium metal, ruthenium oxides and ruthenium carbonyls, at a temperature within the range of 100° to 250° C. under a pressure within the range of 700 to 1000 atmospheres, whereby a reaction occurs resulting in the formation of a mixture of straight chain primary hydroxyalkanes in which the number of carbon atoms per molecule is within the range of from 3 to 50, said hydroxyalkanes being formed from the said mixture of carbon monoxide, hydrogen and hydroxylated solvent without any substantial quantity of hydrocarbon being formed, and thereafter separating from the resulting mixture hydroxyalkane in which the number of carbon atoms per molecule is within the range of from 3 to 50.

9. A process for preparing alcohols which comprises introducing into a reaction vessel a mixture of carbon monoxide, hydrogen, and a primary monohydric alkanol having from 3 to 6 carbon atoms per molecule, the mol ratio of hydrogen to carbon monoxide being initially from 2:1 to 5:1, heating the said mixture in the presence of from 0.001% to 20% by weight of a ruthenium dioxide catalyst, at a temperature within the range of 100° to 250° C. under a pressure within the range of 700 to 1000 atmospheres, whereby a reaction occurs resulting in the formation of a mixture of straight chain primary hydroxyalkanes in which the number of carbon atoms per molecule is within the range of from 3 to 50, and separating from the resulting mixture hydroxyalkane in which the number of carbon atoms per molecule is within the range of from 3 to 50.

10. The process of claim 9 in which the said primary monhydric alkanol is n-propanol.

BENJAMIN W. HOWK.
GLENN F. HAGER.

REFERENCES CITED

The following references are of record in the file of this patent:

UNITED STATES PATENTS

| Number | Name | Date |
|---|---|---|
| 2,486,633 | Clark | Nov. 1, 1949 |

OTHER REFERENCES

Intelligence Division Report No. 4149, "Advances in Acetylene Chemistry etc.," March 24, 1945, pages 28 and 29.